United States Patent [19]

Bleier et al.

[11] Patent Number: 5,227,921
[45] Date of Patent: Jul. 13, 1993

[54] LIGHT-WEIGHTED OPTICAL ASSEMBLY

[75] Inventors: Zvi Bleier, Comack; Morton S. Lipkins, Bayside, both of N.Y.

[73] Assignee: PLX Inc., Deer Park, N.Y.

[21] Appl. No.: 799,304

[22] Filed: Nov. 27, 1991

[51] Int. Cl.⁵ .................................................. G02B 5/08
[52] U.S. Cl. ..................................... 359/848; 359/846; 359/883
[58] Field of Search ................ 359/845, 846, 848, 883

[56] References Cited

U.S. PATENT DOCUMENTS

| | | |
|---|---|---|
| 3,507,737 | 4/1970 | Busdiecker et al. . |
| 3,884,558 | 5/1975 | Dunn, III et al. ............... 359/845 |
| 3,912,380 | 10/1975 | Klein . |
| 4,239,344 | 12/1980 | Wildenrotter . |
| 4,264,146 | 4/1981 | Sutton ............................ 359/845 |
| 4,314,742 | 2/1982 | Dye et al. ....................... 359/845 |
| 4,435,045 | 3/1984 | Fried . |
| 4,447,130 | 5/1984 | Christiansen et al. . |
| 4,451,119 | 5/1984 | Meyers et al. . |
| 4,554,197 | 11/1985 | Chyung et al. . |
| 4,731,280 | 3/1988 | Geisseler . |
| 4,875,764 | 10/1989 | Marino et al. . |
| 4,875,765 | 10/1989 | Vandenberg et al. . |
| 4,917,934 | 4/1990 | Sempolinski . |
| 5,076,700 | 12/1991 | DeCaprio ......................... 359/883 |

OTHER PUBLICATIONS

Author: Vitta of Bethel, Conn., Title: Glass Transfer Tape for Sealing Quartz Materials Catalog No.: G 1015.

*Primary Examiner*—Bruce Y. Arnold
*Assistant Examiner*—J. P. Ryan
*Attorney, Agent, or Firm*—Gottlieb, Rackman & Reisman

[57] ABSTRACT

A light-weighted optical assembly is provided. The light-weighted optical assembly of the invention is comprised of two members. Each member is constructed of a section and a plurality of ribs extending from the section and comprises one-half of the total thickness of the optical assembly. The members are fused at second ends of the plurality of ribs in a crossing, abutting manner. It is the crossing, abutting fusion of the two members which maintains the rigidity and stiffness of the optical assembly so as to insure against deflection of any reflective surface.

26 Claims, 3 Drawing Sheets

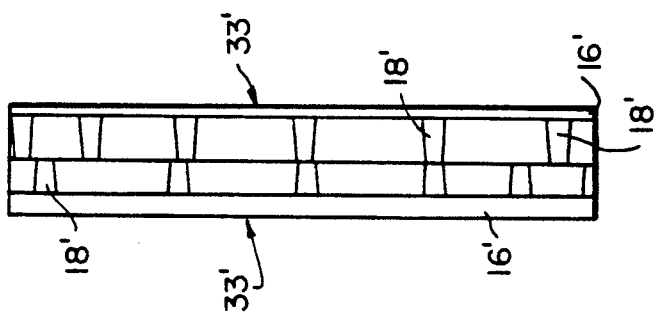
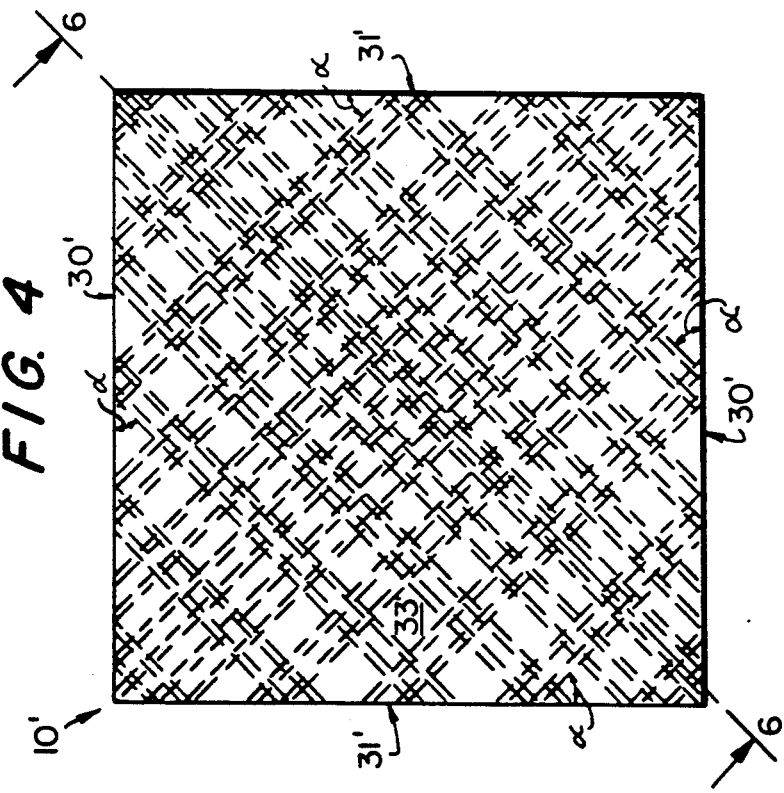
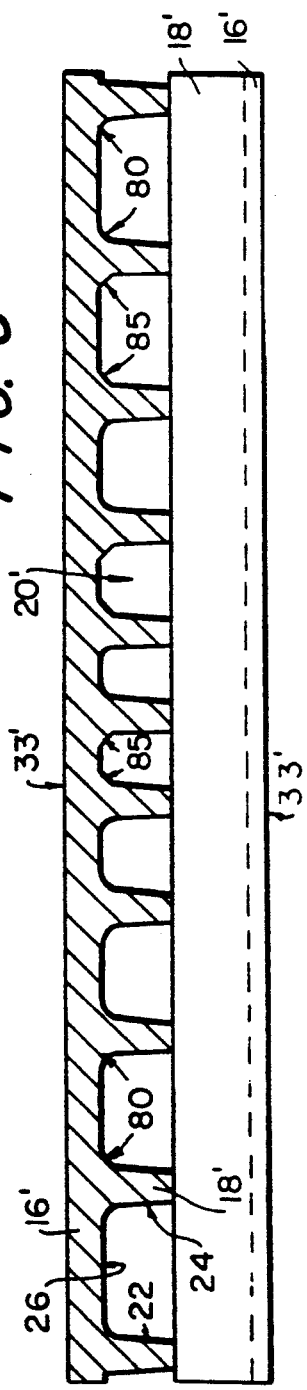

LIGHT-WEIGHTED OPTICAL ASSEMBLY

BACKGROUND OF THE INVENTION

This invention relates to the field of light-weighted optics, and more particularly to a light-weighted optical assembly and a method of constructing a light-weighted optical assembly.

Light-weighted optics is a field which has developed predominantly due to the space program, and the need to reduce weight of optical instruments and the materials used in producing those optical instruments. Since many experiments conducted in space and the functioning of satellites sent into orbit involve the need to reflect light, i.e., such as in a telescope, light-weighted optics have become old in the art.

The thickness of an optical assembly, and accordingly, its weight are directly related to the substrate material used to construct the optical assembly and the area of the reflective surface of the optical assembly. Choice of substrate material is directly related to the substrate's stiffness and to the substrate's coefficient of thermal expansion. It is the stiffness and coefficient of thermal expansion of the substrate which prevent distortion of the reflective surface due to such variables as the weight of the optical assembly and temperature change. For example, a 3'×3'optical assembly (such as a mirror), produced on a substrate having a stiffness ("aspect") ratio of 6 (a normal aspect ratio in the field of optics) would require approximately an 8-inch thick substrate, according to standard practices in the field. It is evident therefore that such a 3'×3'×8" optical assembly would have considerable mass.

Accordingly, it has been shown in the field that weights of optical assemblies can be reduced if the substrate material is reduced. However, since the thickness of the optical assembly with respect to the surface area of the reflective surface can not be varied, different methods of reducing the quantity of substrate material have been developed. Such methods of reducing substrate weight are seen in the following issued patents.

U.S. Pat. No. 3,507,737 to Busdiecker et al. is for an invention directed to the Art of Sealing Thermally Crystallizable Glass, and Thermally Crystallizable Telescope Mirror Blanks. As seen in FIGS. 1-6 of the '737 patent, a telescope mirror blank 9 can either be constructed of substrate layers 10 and 13 separated by substrate spacing members 11 and 12, or of substrate layers 23 and 24 separated by individual substrate spacing members 25 or 29. Prior to the configurations of the '737 patent, such a mirror would essentially have been constructed of a solid substrate mass. This solid substrate would have had a volume defined by the surface area of layer 10 and the thickness of mirror 9. [The thickness of mirror 9 of the '737 patent is defined by the thickness of layers 10 and 13 plus the height of members 11 and 12.] However, the substrate configuration of the '737 patent reduces the overall weight of mirror 9 because the majority of the volume occupied by the substrate of mirror blank 9, is not solid.

The substrate configuration of the '737 patent is seen to consist of interlocking spacing members 11 and 12 (FIGS. 1-3), or a plurality of individual spacing members 25 or 29 (FIGS. 4-6). However, even though these substrate configurations reduce the weight of mirror 9, a number of disadvantages stem from the methods of constructing the '737 mirrors: 1) the securing together of interlocking members 11 and 12 and the non-uniform nature of having to connect upper and lower members 10 and 13 or 23 and 24 to spacing members 11 and 12, 25 or 29, respectively, creates increased areas of possible failure and therefore a heightened probability of mirror distortion; and 2) the structures are inherently more difficult to construct.

U.S. Pat. No. 3,912,380 to Klein for a Composite Type Structure for Large Reflective Mirrors shows another previous method of constructing light-weighted mirrors. As shown in FIG. 4 of the '380 patent the mirror is predominantly constructed of a honeycomb structure 12. Attached to one surface of honeycomb structure 12 is a series of three plates; top plate 22, isolator 16 and mirror 14 having reflective surface 24. The construction of the '380 patent is prohibitive since the formation of honeycomb structure 12 is costly and the inherent nature of the 3-piece (pieces 22, 16 and 24) reflecting structure lends itself to a less accurate mirror.

Finally, U.S. Pat. No. 4,917,934 to Sempolinski for a Telescope Mirror Blank and Method of Production shows in FIGS. 1-5 a light-weighted mirror having an assembly 40 constructed of interlocking struts 32 having slots 34 adapted to receive a cross strut 36 having slots 38. This method of forming the inner core of the light-weighted mirror shown in FIGS. 1-5 of the '934 patent is similar to that of the method shown in FIGS. 1-3 of the '737 patent discussed above, and has the same inherent shortfalls. A second embodiment of the '934 patent, shown in FIGS. 6 and 7, is directed to a plurality of tubes 60 which are joined together to make a honeycombed core assembly 70. Both of the structures of the '934 patent are difficult to construct and have many areas of possible failure. Therefore, it is less likely to achieve accuracy with these mirrors, or if the desired precision is achieved, it is more likely that it will be lost due to structural failure.

Accordingly, it would be desirable to provide a light-weighted optical assembly having fewer connected pieces and no interlocking pieces, while still maintaining rigidity and stiffness so as to avoid deflection of any reflective surface, while also achieving substantial weight reduction of the overall optical assembly.

SUMMARY OF THE INVENTION

In accordance with the invention, an improved light-weighted optical assembly and a method of constructing a light-weighted optical assembly is provided. The light-weighted optical assembly of the invention is comprised of two members. Each member is constructed of a section having top and bottom faces and a plurality of ribs extending from the bottom face of the section. Each member comprises one-half of the total thickness of the optical assembly.

The top face of each section is able to receive a reflective surface. The reflective surface can be flat, concave or convex, depending upon the thickness of the section (i.e., uniform thickness for flat, non-uniform thickness for concave or convex).

Defined by the space between each rib and the portion of the bottom face of the section between each rib is a channel. It is the channeling of the substrate material which causes the reduction in weight of the present light-weighted optical invention.

The two members are fused at the second ends of the ribs in a crossing, abutting manner. It is the crossing, abutting fusion of the two members which maintains the rigidity and stiffness of the optical assembly so as to insure against deflection of any reflective surface.

Accordingly, it is an object of the invention to provide an improved light-weighted optical assembly.

Still another object of the invention is to provide a light-weighted optical assembly having two members.

Still a further object of the invention is to provide a light-weighted optical assembly wherein the two members each consist of a section, a plurality of ribs extend from the section and at least one channel between the ribs whereby the creation of the channel reduces the weight of the optical assembly.

Yet another object of the invention is to provide a light-weighted optical assembly wherein the two members are fused in a crossing, abutting manner at the second ends of the plurality of ribs so as to maintain the structural rigidity and stiffness of the optical assembly.

Other objects of the invention will in part be obvious and will in part be apparent from the following description.

The invention accordingly comprises an assembly possessing the features, properties and the relation of components which will be exemplified in the products hereinafter described and the method of constructing the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 4 is a top plan view of a light-weighted optical assembly showing the ribs in an alternate orientation to the section;

FIG. 5 is a side elevational view of the light-weighted optical assembly of FIG. 4; and FIG. 6 is a cross-sectional view taken along line 6—6 of FIG. 4.

DETAILED DESCRIPTION OF THE PREFERRED EMBODIMENTS

Figure 1:
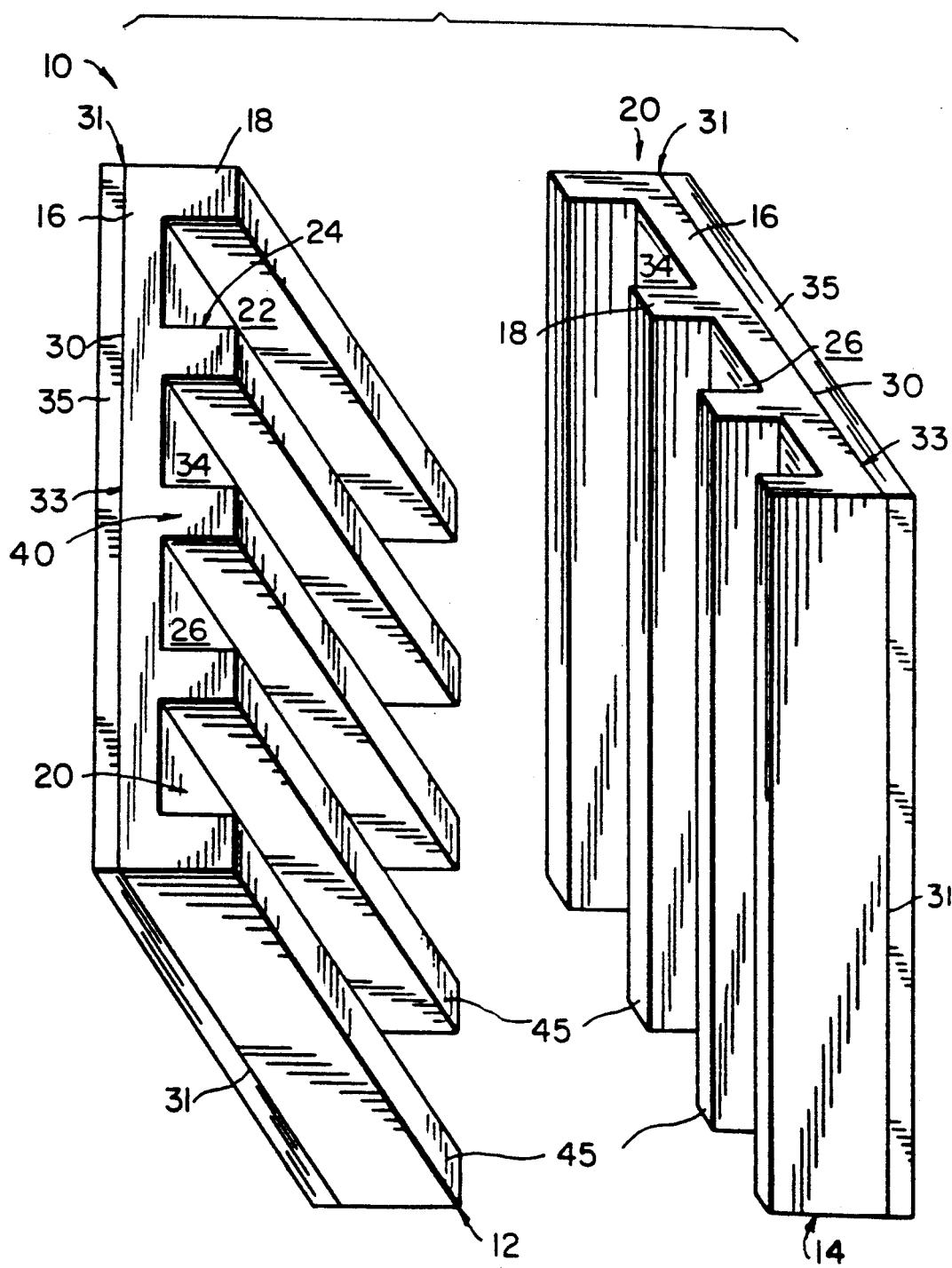
FIG. 1 is an exploded perspective view of a light-weighted optical assembly in accordance with the invention.
Figure 2:
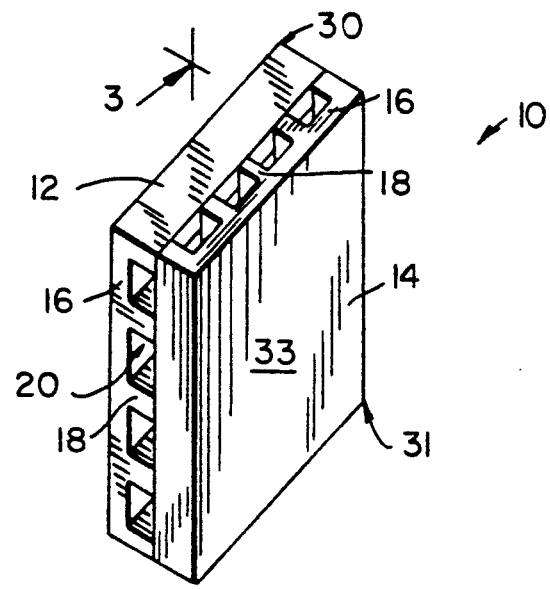
FIG. 2 is a perspective view of the light-weighted optical assembly of FIG. 1.

Referring first to FIGS. 1 and 2, a light-weighted optical assembly made in accordance with the invention and generally designated at 10 is illustrated. Light-weighted optical assembly 10 includes a first member 12 and a second member 14. Each of members 12 and 14 includes a section 16 having a top face 33 and a bottom face 34 and a plurality of ribs 18 extending from bottom face 34 of section 16.

It is important to note that the number of ribs will always be at least two, but will most probably be greater than two for any given assembly 10. The number of ribs will vary for each assembly 10 constructed, and will depend upon the individual specifications for each optical assembly. Additionally, and as seen in FIGS. 4–6, the shape of the ribs can also vary. In general, however, although the number and shape of ribs 18 can vary, all of ribs 18 are the same height away from section 16 and all of ribs 18 have first and second ends 40 and 45, respectively.

First ends 40 of ribs 18 are defined at the intersection of each of ribs 18 with bottom face 34 of section 16. Accordingly, if ribs 18 were separable pieces (which is possible, but not preferred for the present invention) first ends 40 would be attached to bottom face 34 of section 16.

Continuing with FIG. 1, second ends 45 of each of ribs 18 are planar in construction. Further, all of second ends 45 of ribs 18 of first member 12 are in the same plane and all of second ends 45 of ribs 18 of second member 14 are in the same plane. Accordingly, since all of second ends 45 of ribs 18 of first member 12 are in the same plane and all of second ends 45 of ribs 18 of second member 14 are in the same plane, substantially flat surfaces are created, and members 12 and 14 can be fused along second ends 45 of ribs 18, as discussed below.

Continuing with FIGS. 1 and 2, between each pair of ribs 18 is a channel 20. Accordingly, for an assembly 10 having two ribs 18 there would be one channel 20, for an assembly 10 having three ribs 18 there would be two channels 20, and so on. Each of channels 20 has a first side 22, a second side 24 and a top side 26. Sides 22 and 24 are found on adjacent ribs 18 and the height of each side 22 and 24 are equivalent to the height of ribs 18 away from section 16. Therefore, since ribs 18 are all of the same height (i.e., the dimension between first end 40 and second end 45 of each rib 18), sides 22 and 24 of channels 20 are also the same height. Top side 26 of channel 20 is on bottom face 34 of section 16, is located between sides 22 and 24 and is in the same plane as first end 40 of ribs 18.

Members 12 and 14 are preferably identical in construction, each one making up exactly one-half of the total thickness of light-weighted optical assembly 10 (i.e., the distance between top face 33 of member 12 and top face 33 of member 14). If members 12 and 14 are identically constructed, section 16, ribs 18 and channels 20 of first member 12 would be identical in thickness, shape and configuration to section 16, ribs 18 and channels 20 of second member 14. As will be discussed below with respect to FIGS. 4–6, ribs 18 do not have to be of a rectangular cross-section, and channels 20 can vary in width depending upon the spacing between ribs 18. Members 12 and 14 can also vary as to their construction. Most usually, it will be the thickness of sections 16 of members 12 and 14 which is varied (see FIGS. 5 and 6).

Directing our attention again to FIG. 1, a reflective surface 35 is provided on at least one of top faces 33 of sections 16, but can also be provided on both of top faces 33 of sections 16 of members 12 and 14. Reflective surface 35 can be created by any of the methods known in the art of creating such a reflective surface. However, reflective surface 35 is preferably made from polishing top face 3 of section 16 with either evaporated silver, evaporated gold or evaporated aluminum.

Additionally, depending upon whether the thickness of section 16 is uniform or non-uniform, reflective surface 35 will be either flat, concave or convex. For example, a uniform thickness for section 16 will create a flat reflective surface 35, while a nonuniform thickness for section 16 can be used to create a concave or convex reflective surface 35.

Continuing with FIG. 1, it is seen that ribs 18 extend from bottom face 34 of section 16 in a direction from first end 40 towards second end 45, and therefore, away from top face 33 of section 16. Ribs 18 also extend longitudinally for the entire length of members 12 and 14. As previously discussed, each of ribs 18 extend from bottom face 34 of section 16 along first end 40; the "extension" of ribs 18 from bottom face 34 of section 16 along first ends 40 is preferably as if ribs 18 and section 16 are of one piece. However, in some cases it may be that ribs 18 are separate pieces and must be attached to bottom face 34 of section 16; this is not, however, preferred.

Figure 3:
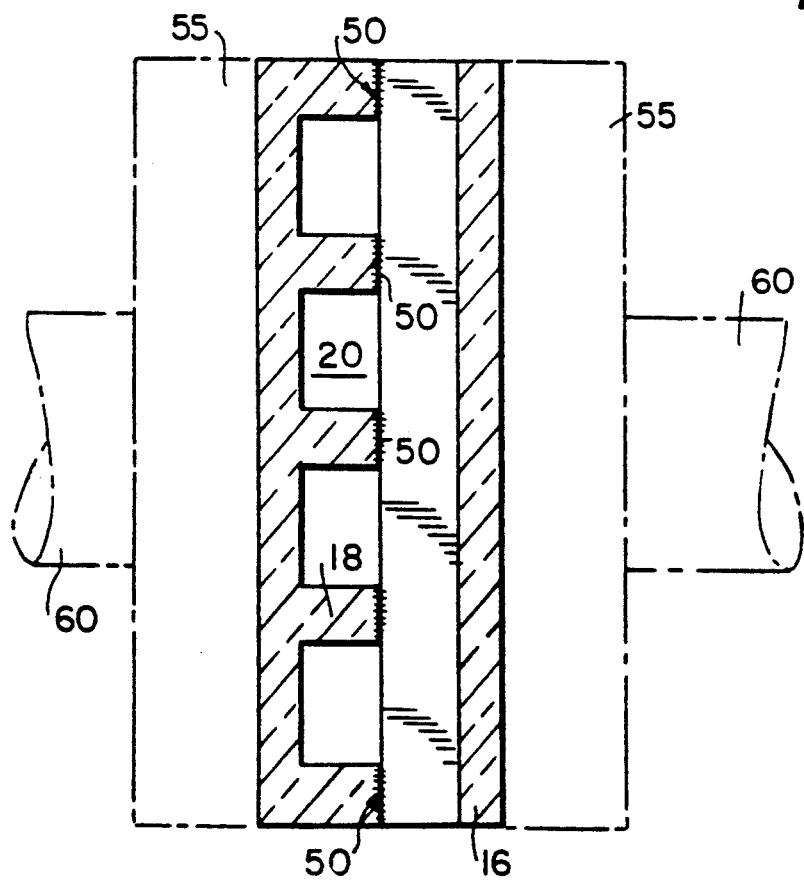
FIG. 3 is a cross-sectional view taken along line 3—3 of FIG. 2.

Turning now to FIGS. 2 and 3, first member 12 and second member 14 are fused at second ends 45 of ribs 18. Specifically, and as seen best in FIG. 2, first member 12 and second member 14 are fused so that ribs 18 of first member 12 and ribs 18 of second member 14 are abutting at second ends 45 of ribs 18. It is preferred that ribs 18 abut perpendicularly, but if they do not, in no event should they abut in such a manner as not to cross at all.

Accordingly, a portion of second ends 45 of each of ribs 18 of first member 12 will abut and cross a portion of second ends 45 of each of ribs 18 of second member 14. It is on these abutting planes of second ends 45 of each of ribs 18 that a fusing material is placed so that when first member 12 and second member 14 are placed together, they become fused at these areas of contact.

Because of the crossing, abutting joinder of members 12 and 14, assembly 10 maintains its rigidity and stiffness both transversely and longitudinally. Additionally, because there are only two pieces of assembly 10 (members 12 and 14), when ribs 18 are of one piece with section 16, there is a limited number of areas upon which the fusion of members 12 and 14 depend.

Unlike the previously discussed prior art patents, the present invention has no interlocking spacing members or individual spacing members and preferably does not have separate reflecting sections which must be attached to the spacing members. Accordingly, assembly 10 of the present invention has far fewer areas upon which fusion of the separate parts depends. Therefore, the construction of assembly 10 is advantageous over the prior art because: 1) there is less likelihood that the structure will lose reflective accuracy due to failure of a fused area; 2) there are fewer pieces and it is therefore easier to maintain high precision with respect to the making of the separate pieces; and 3) the method of assembling assembly 10 (discussed immediately below) is far less complicated.

The method of creating light-weighted optical assembly 10 of the present invention is best shown in FIG. 3 and is as follows.

To assemble a light-weighted optical assembly in accordance with the present invention, it is first necessary to determine the appropriate specifications (i.e., dimensions) required for the assembly; such as 1) the surface area of reflective surface 35 and accordingly 2) the total thickness of assembly 10, 3) the thickness of sections 16, 4) the sizes of channels 20 and 5) the shapes of ribs 18. Once these dimensions have been determined, members 12 and 14 must be created of a substrate material (i.e., silica, quartz, pyrex or ULE) so as to meet these specifications. It is again noted that the specifications may require that channels 20 be of different sizes (see FIG. 6), or that ribs 18 have different shapes (see FIGS. 1 and 6).

Once members 12 and 14 are formed, the method of assembling assembly 10 of the present invention, as best seen in FIG. 3, then consists of applying a fusing material 50 to the areas of second ends 45 of ribs 18 of first member 12 which will abut areas of second ends 45 of ribs 18 of second member 14, and applying fusing material 50 to those areas of second ends 45 of ribs 18 of second member 14 which will abut the areas of second ends 45 of ribs 18 of first member 12 which have also received fusing material 50.

Fusing material 50 is preferably an inorganic material mixed with an organic material. Fusing material 50 has a relatively low melting point (approximately 900° Celsius) and is used in the known fusion method called Frit bonding. The advantage of the Frit bonding method is that direct fusing of the substrate parts of members 12 and 14 is eliminated and accordingly the normally high fusing temperatures (approximately 1800° Celsius) needed to melt the substrate material, need not be generated. Fusing material 50 normally has a low coefficient of thermal expansion, so that members 12 and 14 can be fused without the large stresses normally caused by thermal expansion mismatch. After fusing is completed, a hermetic seal is obtained between second ends 45 of ribs 18 of members 12 and 14 through fusing material 50.

Continuing with FIG. 3, after fusing material 50 has been applied to those areas of second ends 45 of ribs 18 which will abut, members 12 and 14 are rotated with respect to each other so that the longitudinal lengths of ribs 18 of first member 12 are crossing, and preferably, are perpendicular to the longitudinal lengths of ribs 18 of second member 14. Members 12 and 14 are then aligned and pressed together so that second ends 45 of ribs 18 are abutting. Plates 55, which are of a size substantially equal to the surface area of top faces 33 of sections 16 of members 12 and 14, are secured over top faces 33 by clamps 60.

A plurality of clamps 60 should be used, wherein the plurality of clamps 60 consist of various different clamp 60 sizes. The necessity of having a plurality of different sized clamps 60 is attributed to the need to apply a substantially uniform pressure across plates 55 so as to achieve as uniform of a seal between first member 12 and second member 14 as possible through fusing material 50. Accordingly, having different sized clamps 60 enables pressure to be exerted not just around the perimeter of plates 55, but at the center of plates 55 and at any desired intermediate points.

Once members 12 and 14 have been securely joined together by the torquing of clamps 60 to achieve substantially uniform pressure, the entire assembly is placed into an oven and heated to approximately 900° Celsius. At 900° Celsius, fusing material 50 melts. Once melted, fusing material 50 is allowed to cool, at which time a hermetic seal exists between first member 12 and second member 14.

As discussed above, fusing material 50 is preferably an inorganic material mixed with an organic material. The final configuration of fusing material 50, after the fusing of members 12 and 14 is completed in the oven, will be of pure inorganic material. The organic material, whose purpose is merely to commence the bonding of first member 12 to second member 14 while clamping is being perfected, will evaporate out of fusing material 50 once the temperature in the oven reaches approximately 200° Celsius. Accordingly, once the final temperature of approximately 900° Celsius is reached fusing material 50 is devoid of any organic material. It then melts and when cooled becomes one with the substrate material (also an inorganic material) of members 12 and 14. Without evaporation of the organic material, the coefficients of thermal expansion as between fusing material 50 and the substrate material of members 12 and 14 would not be substantially identical. If this were to occur, a non-uniformity of stresses would arise throughout assembly 10 causing deflection of reflective surface 35 and therefore loss of accuracy of assembly 10.

Turning now to FIGS. 4-6, as previously discussed, channels 20 can be of varying sizes, while ribs 18 can be of varying shapes. Preferably however, channels 20 will only vary with respect to width (as seen best in FIG. 6) and ribs 18 will only vary with respect to their cross-sectional area (also as seen best in FIG. 6). The variation in cross-sectional area of ribs 18 will depend upon whether sides 22 and 24 of channels 20 are perpendicular planes to the plane of top sides 26 of channels 20. Specifically, the variation of the cross-sectional area of ribs 18 can take the following forms: 1) substantially rectangular in shape as seen in FIG. 1, or 2) tapered from first end 40 (larger) to second end 45 (smaller) as seen with respect to ribs 18 of FIG. 6.

Additionally, the edges of intersection between sides 22 and 24 and top sides 26 of channels 20, should take one of three shapes: 1) rounded as seen at edges 80 of FIG. 6; 2) chamfered as seen at edges 85 of FIG. 6; or 3) at an angle created by the meeting between two intersecting planes as seen at edges 90 of FIG. 1.

Continuing with FIGS. 4-6, optical assembly 10' differs from optical assembly 10 of FIGS. 1-3 only with respect to the orientation of ribs 18' and channels 20'. Specifically, as seen in FIG. 1, ribs 18 and channels 20 are substantially parallel in their longitudinal direction with edges 31 of top face 33, while they are substantially perpendicular to edges 30 of top face 33.

However, as seen in FIG. 4, ribs 18' and channels 20' of assembly 10' intersect at an acute angle λ with edges 31' and 30' of top face 33'. All other aspects of assembly 10' shown in FIGS. 4-6 are identical to assembly 10 shown in FIGS. 1-3. Specifically, the method of assembling assembly 10' of FIGS. 4-6 is identical with the method of assembling assembly 10 of FIGS. 1-3, as previously discussed. Further, the variability of the size of channels 20' and the shapes of ribs 18' of assembly 10' of FIGS. 4-6 are also identical with the previously discussed sizes and shapes of channels 20 and ribs 18 for assembly 10 of FIGS. 1-3.

It will thus be seen that the objects set forth above, among those made apparent from the preceding description, are efficiently attained and, since certain changes may be made in the above constructions and methods of construction, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A light-weighted optical assembly, comprising:
    a first member and a second member, each of said members comprising:
        a section having a top face and a bottom face defining a thickness of said section;
        a plurality of ribs extending from said bottom face of said section from a first end of said ribs; and
        at least one channel defined by said plurality of ribs extending completely through said assembly; and
    fusing means applied to second ends of said plurality of ribs of said first and second members for joining said first and second members, wherein said second ends of said plurality of ribs of said first member and said second ends of said plurality of ribs of said second member are substantially crossingly abutting.

2. A light-weighted optical assembly as recited in claim 1, wherein at least one of said top faces of said sections is substantially flat.

3. A light-weighted optical assembly as recited in claim 1, wherein at least one of said top faces of said sections is substantially concave.

4. A light-weighted optical assembly as recited in claim 1, wherein at least one of said top faces of said sections is substantially convex.

5. A light-weighted optical assembly as recited in claim 1, wherein at least one of said top faces of said sections has a reflective surface.

6. A light-weighted optical assembly as recited in claim 5, wherein said ribs are of one piece with said section.

7. A light-weighted optical assembly as recited in claim 6, wherein said at least one channel has first and second sides intersecting with a top side.

8. A light-weighted optical assembly as recited in claim 7, wherein said intersection of said first side and said top side is substantially perpendicular.

9. A light-weighted optical assembly as recited in claim 8, wherein said intersection of said second side and said top side is substantially perpendicular.

10. A light-weighted optical assembly as recited in claim 7, wherein said intersections of said first and second sides with said top side forms edges.

11. A light-weighted optical assembly as recited in claim 10, wherein each of said edges is rounded.

12. A light-weighted optical assembly as recited in claim 10, wherein each of said edges is chamfered.

13. A light-weighted optical assembly as recited in claim 10, wherein each of said second ends of said plurality of ribs of said first and second members is planar, each of said planar ends of said ribs of said first member occupying the same plane and each of said planar ends of said ribs of said second member occupying the same plane.

14. A light-weighted optical assembly as recited in claim 13, wherein said thickness of said section of said first member is the same as said thickness of said section of said second member.

15. A method of assembling a light-weighted optical assembly comprising the steps of:
    forming first and second members, each of said members comprising a section having a top face and a bottom face and a plurality of ribs extending from said bottom face of said section at first ends of said ribs and ending at second ends of said ribs, wherein said plurality of ribs defines at least one channel extending completely through said assembly;
    applying fusing means to said second ends of said plurality of ribs of said first and second members; and
    fusing said first and second members at said second ends of said ribs so that said second ends of said ribs of said first member and said second ends of said ribs of said second member are substantially crossingly abutting.

16. A method of assembling a light-weighted optical assembly as recited in claim 15, wherein said fusing step further comprises the steps of:
   attaching plates to said top and bottom faces of said sections of said first and second members;
   clamping said first and second members together using a plurality of clamps to apply pressure to said plates; and
   torquing each of said clamps to achieve substantially uniform pressure on said plates.

17. A method of assembling a light-weighted optical assembly as recited in claim 16, further comprising the step of polishing at least one of said top faces of said sections of said first and second members after said fusing step to form a reflective surface.

18. A light-weighted optical assembly assembled in accordance with the method of claim 17.

19. A light-weighted optical assembly assembled in accordance with the method of claim 16.

20. A light-weighted optical assembly assembled in accordance with the method of claim 15.

21. A method of assembling a light-weighted optical assembly, comprising the steps of:
   assembling first and second members each of said members comprising a section having a top face and a bottom face and a plurality of ribs extending from said bottom face of said section by attaching each of said ribs of said plurality of ribs to said section along a first end of said ribs, wherein said plurality of ribs defines at least one channel extending completely through said assembly;
   applying fusing means to second ends of each of said ribs of said plurality of ribs of said first and second members, said second ends of said ribs being opposite said first ends of said ribs; and
   fusing said first and second members at said second ends of said ribs so that said second ends of said ribs of said first member and said second ends of said ribs of said second member are substantially crossingly abutting.

22. A method of assembling a light-weighted optical assembly as recited in claim 21, wherein said fusing step further comprises the steps of:
   attaching plates to said top and bottom faces of said sections of said first and second members;
   clamping said first and second members together using a plurality of clamps to apply pressure to said plates; and
   torquing each of said clamps to achieve substantially uniform pressure on said plates.

23. A method of assembling a light-weighted optical assembly as recited in claim 22, further comprising the step of polishing at least one of said top faces of said sections of said first and second members after said fusing step to form a reflective surface.

24. A light-weighted optical assembly assembled in accordance with the method of claim 23.

25. A light-weighted optical assembly assembled in accordance with the method of claim 22.

26. A light-weighted optical assembly assembled in accordance with the method of claim 21.

* * * * *